(12) United States Patent
Kumar

(10) Patent No.: US 11,900,462 B2
(45) Date of Patent: Feb. 13, 2024

(54) SYSTEMS AND METHODS FOR ACCOUNT AUTOMATION AND INTEGRATION

(71) Applicant: The Athene Group, Herndon, VA (US)

(72) Inventor: Sanjeev Kumar, Laurel, MD (US)

(73) Assignee: The Athene Group, Herndon, VA (US)

( * ) Notice: Subject to any disclaimer, the term of this patent is extended or adjusted under 35 U.S.C. 154(b) by 191 days.

(21) Appl. No.: 15/691,348

(22) Filed: Aug. 30, 2017

(65) Prior Publication Data

US 2018/0060965 A1 Mar. 1, 2018

Related U.S. Application Data

(60) Provisional application No. 62/381,255, filed on Aug. 30, 2016.

(51) Int. Cl.
*G06Q 40/06* (2012.01)

(52) U.S. Cl.
CPC .................................. *G06Q 40/06* (2013.01)

(58) Field of Classification Search
None
See application file for complete search history.

(56) References Cited

U.S. PATENT DOCUMENTS

| | | | |
|---|---|---|---|
| 8,639,625 B1 * | 1/2014 | Ginter ..................... | G06F 21/10 705/50 |
| 9,262,446 B1 * | 2/2016 | Katragadda ............. | G06F 16/20 |
| 2006/0116949 A1 * | 6/2006 | Wehunt .................. | G06Q 10/00 705/35 |
| 2008/0215377 A1 * | 9/2008 | Wottowa ................ | G06Q 40/00 705/4 |
| 2011/0288969 A1 * | 11/2011 | Wiech .................... | G06Q 50/16 705/30 |
| 2013/0013476 A1 * | 1/2013 | Knafelz ................. | G06Q 40/00 705/35 |
| 2013/0304637 A1 * | 11/2013 | McCabe ................ | G06Q 40/02 705/39 |
| 2014/0075516 A1 * | 3/2014 | Chermside ............ | H04L 63/061 726/4 |
| 2015/0088707 A1 * | 3/2015 | Drury ................... | G06Q 20/227 705/30 |
| 2015/0310188 A1 * | 10/2015 | Ford ..................... | G06F 21/10 726/28 |

(Continued)

OTHER PUBLICATIONS

Oct. 9, 2016. Intrinio. http://blog.intrinio.com/whats-an-api-call-and-how-are-they-counted/ Accessed Aug. 31, 2019 (Year: 2016).*

(Continued)

*Primary Examiner* — David P Sharvin
(74) *Attorney, Agent, or Firm* — DLA Piper LLP (US)

(57) ABSTRACT

A processor may receive and analyze client information. The processor may automatically generate at least one form specification based on the analyzing, the at least one form specification being in a format useable by an external form generation service. The processor may send the at least one form specification to the external form generation service and receive at least one signable form from the external form generation service. The processor may receive at least one signed copy of each at least one signable form. The processor may automatically establish at least one account with at least one external service based on the at least one signable form.

16 Claims, 17 Drawing Sheets

(56) References Cited

U.S. PATENT DOCUMENTS

2015/0350211 A1* 12/2015 Burgess .................. H04L 63/10
726/30
2017/0330233 A1* 11/2017 Bruno ................ G06Q 30/0255
2018/0276270 A1* 9/2018 Bisbee ................ G06F 21/6218

OTHER PUBLICATIONS

Dec. 20, 2012. API Evangelist. http://apievangelist.com/2012/12/20/history-of-apis/ Accessed Aug. 31, 2019 (Year: 2012).*
"Serialization" Wikipedia.org, https:/web.archive .org/web/20120621203934/https ://en.wikipedia.org/wiki/Serialization, accessed Sep. 28, 2020, Date: Jun. 14, 2012 (Year: 2012).*

* cited by examiner

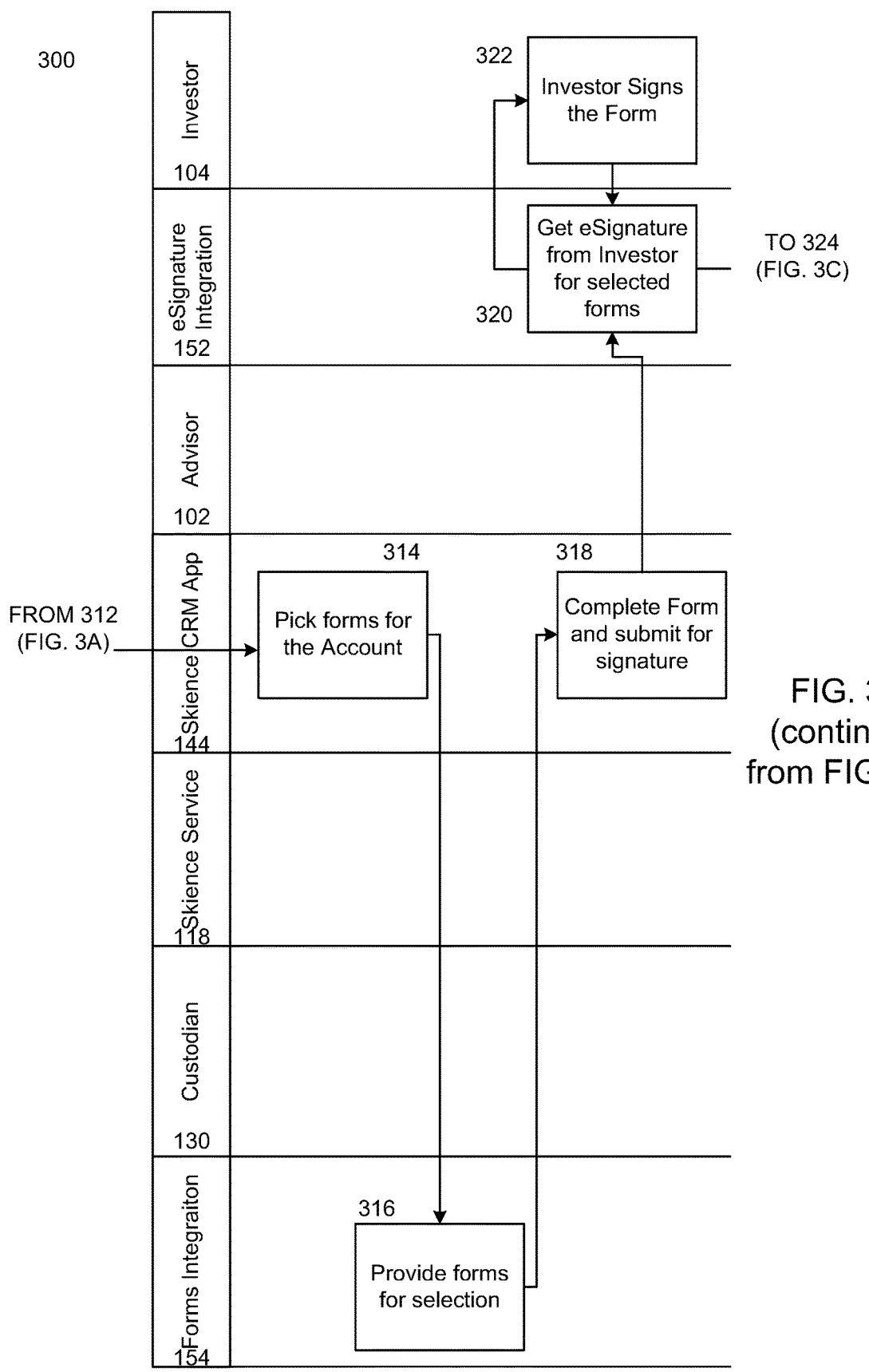
FIG. 3B (continued from FIG. 3A)

from FIG. 3B)

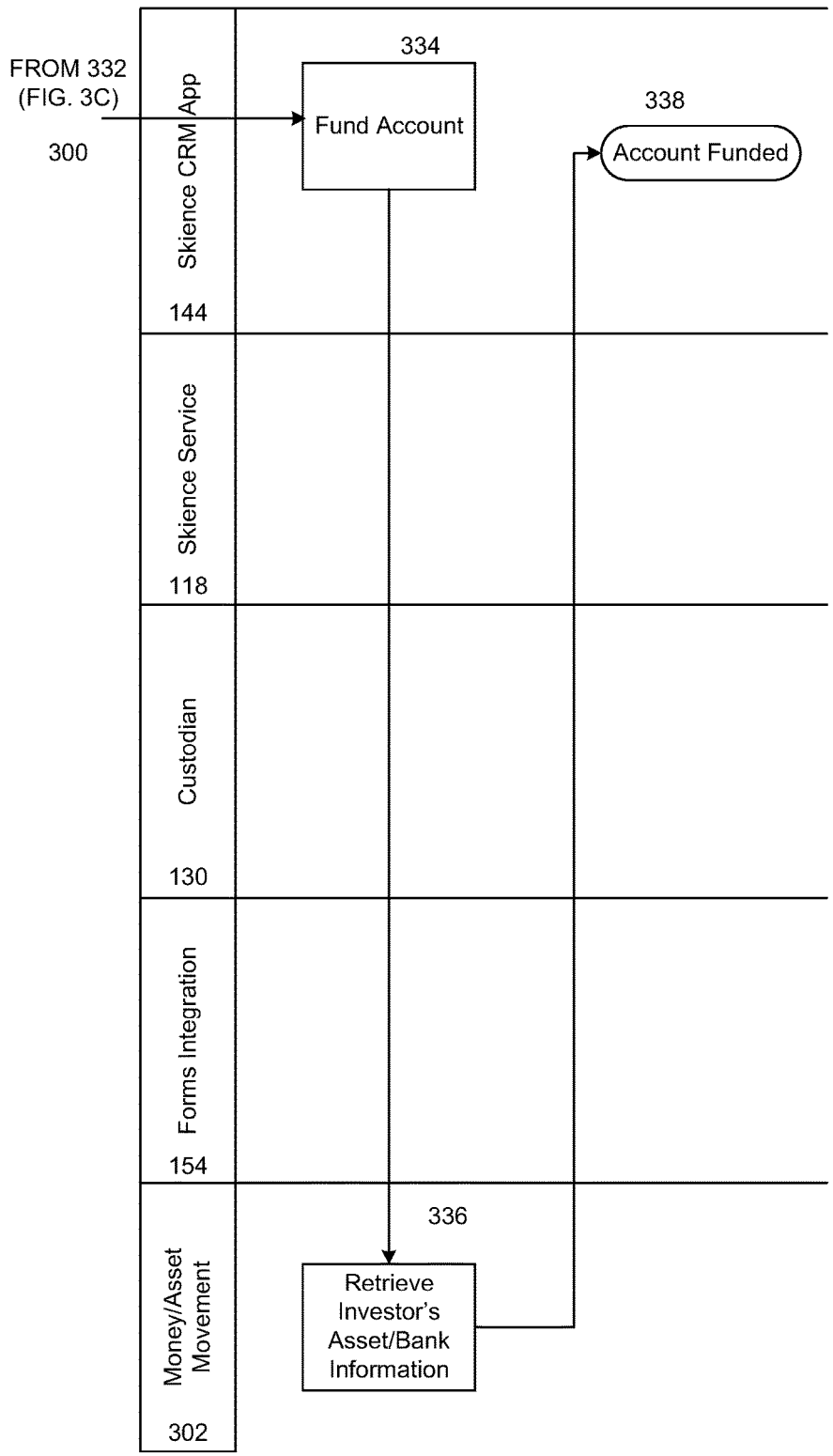
FIG. 3D
(continued from FIG. 3C)

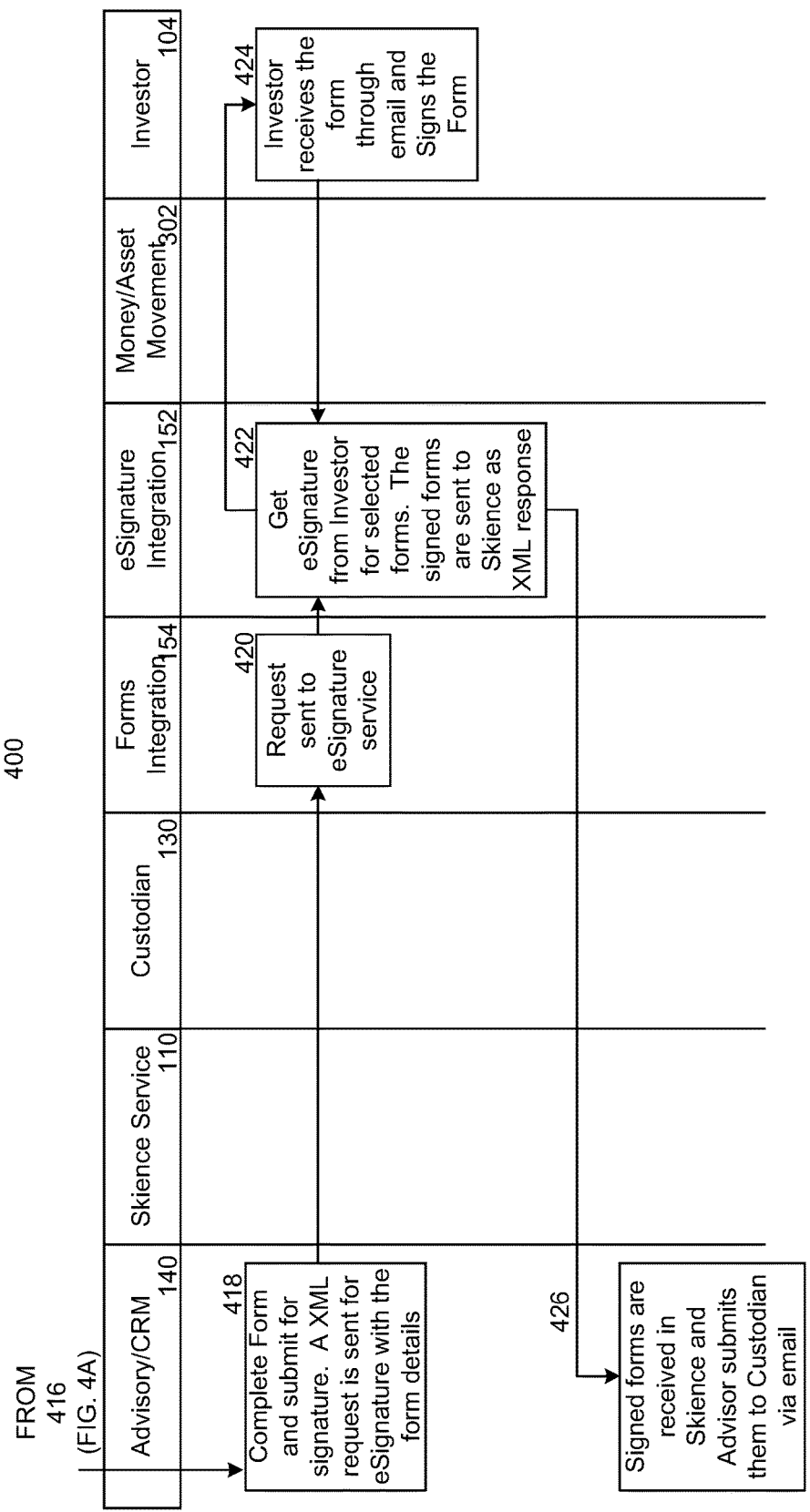
FIG. 4B (continued from FIG. 4A)

from FIG. 4B)

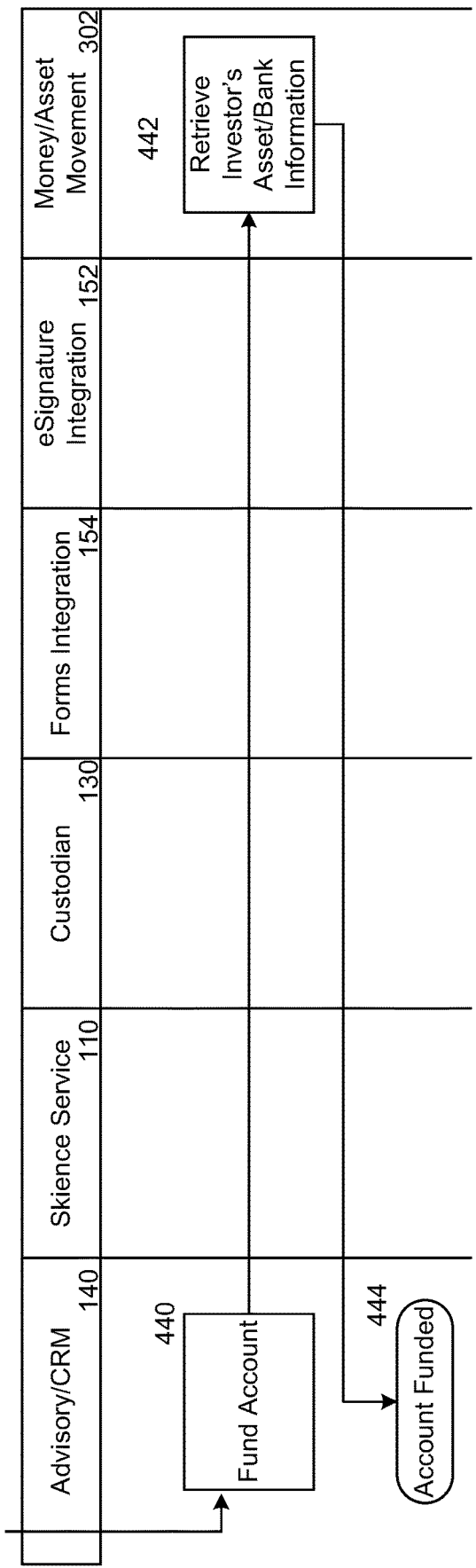
FIG. 4D
(continued from FIG. 4C)

FIG. 5A

Salesforce | Search Salesforce | 0 s | 1130.97 KB | + | New Account Opening

ACCOUNT
ASHLEY JAMES

+ Follow

RELATED | DETAILS

Contacts (1)

Ashley James
Title: VP, Finance
Email: ajames@uog.com
Phone: +44 191 4956203
View All

Financial Account Primary Owner (6+)

New

| FINANCIAL ACCOUNT NAME | RECORD TYPE | PRODUCT TYPE | PRODUCT COMPANY | |
|---|---|---|---|---|
| Ashley's Account | Investment Account | Brokerage Account | Charles Schwab | ▶ |
| New Sample Account | Investment Account | Brokerage Account | Charles Schwab | ▶ |
| New Financial Account | Investment Account | Advisory | Charles Schwab | ▶ |
| New Sample Account | Investment Account | Advisory | Charles Schwab | ▶ |
| Test | Investment Account | Brokerage Account | National Financial Brokerage | ▶ |
| a0736000006ekco | Investment Account | | | ▶ |

View All

Financial Account Primary Owner (6+)

New

| ROLE NUMBER | FINANCIAL ACCOUNT | ROLE | ACTIVE | |
|---|---|---|---|---|
| ROLE NUMBER | FINANCIAL ACCOUNT | Additional Owner | ACTIVE | ▶ |

ACTIVITY | COLABORATE

Email

To

Show | All Activities ▼

Next Steps — No next steps. To get things moving, add a task or set up a meeting Past Activity — No past activity. Past meetings and tasks marked as done show up here.

Salesforce | Search Salesforce | 3.25 s | 700.02KB

ACCOUNT
ASHLEY JAMES

New Account Opening

Basic Information | TBD

0% Complete

Basic Information

*Financial Account Name
James #4346

Product Type
Brokerage Account

Product Company
Joint

Account Type
Joint

[Next]

? Help

Please enter product type and account company. Setting a product type would expose appropriate values for account type. Setting an account type would expose appropriate values for account type.

✓ NIGO Information

The application is in good order so far

FIG. 5E salesforce | Search Salesforce | 3.25 s | 797.89KB

ACCOUNT
ASHLEY JAMES

New Account Opening

> > > △ > > > Final > TBD  100% Complete

Almost there!
Please review and complete the fields listed in the "NIGO Information" section shown on the right. These fields can be accessed by clicking on screens marked with an exclamation (!) mark at the top.

[Previous]

? Help

△ NIGO Information
The following field(s) must be filled before submitting this application for account opening.
Payment Type Screen: Investment Amount

SYSTEMS AND METHODS FOR ACCOUNT AUTOMATION AND INTEGRATION

CROSS-REFERENCE TO RELATED APPLICATION

This application claims the benefit of priority from U.S. Provisional Application No. 62/381,255, filed Aug. 30, 2016, the entirety of which is incorporated by reference herein.

BRIEF DESCRIPTION OF THE DRAWINGS

FIGS. 3A-3D illustrate an example of straight through processing including user interactions with the system according to an embodiment of the invention.

FIGS. 4A-4D illustrate processing that may be performed by the system to accomplish the straight through processing of FIGS. 3A-3D according to an embodiment of the invention/

FIGS. 5A-5F show screenshots for an account opening wizard according to an embodiment of the invention.

DETAILED DESCRIPTION OF SEVERAL EMBODIMENTS

Figure 1:
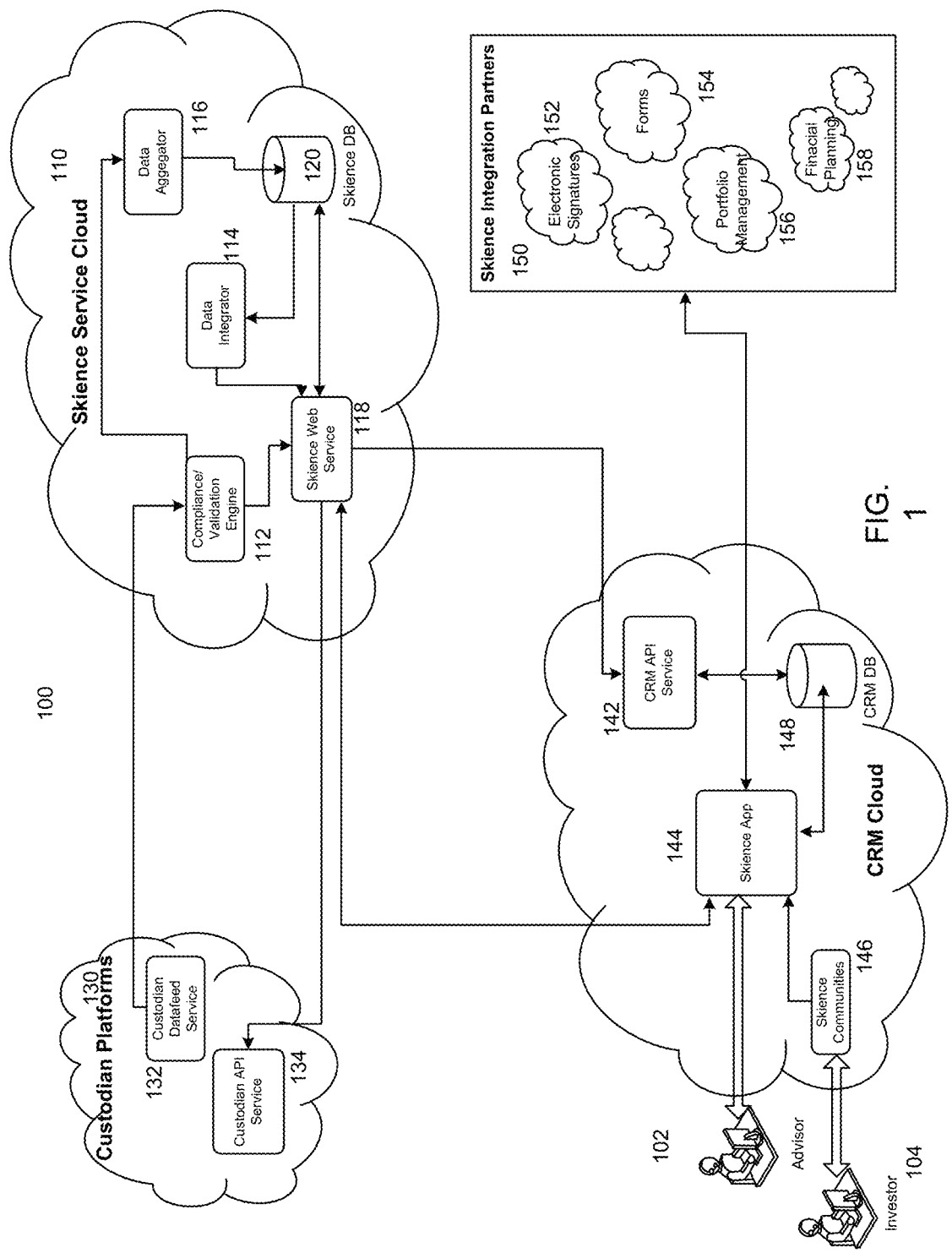
FIG. 1 is a diagram of a system for account automation and integration according to an embodiment of the invention.

Systems and methods described herein may automate records integration for advisor-managed accounts such as financial accounts or the like. For example, users (e.g., advisors or administrators) may input data into a server or other system configured to perform the processes described herein to automatically generate tangible results.

The systems and methods described herein may provide a unified account opening experience for users. Users may not have to learn how to use different proprietary custodian application programming interfaces (APIs) and portals. The systems and methods described herein may present and capture custodian specific data elements and perform custodian specific transformations for the various APIs. Thus, users may be able to use the full power/feature set offered by custodians. The unified account opening experience may not limit/restrict what users can do.

The systems and methods described herein may integrate tightly with customer relationship management (CRM) systems, for example integrating investor information between the CRM system and the vendor systems, thus reducing duplicate data entry and enhancing overall data quality and integrity. The systems and methods described herein may facilitate suitability and Office of Foreign Assets Control (OFAC) checks to enable customers to be in compliance with various regulations.

Account opening, within the context of financial accounts, is the process of establishing new accounts with custodians/product manufacturers, hereafter custodians. Account opening may entail capturing/collecting information that may include, but is not limited to, account type, account preferences, account intent, ownership, beneficiaries, owner demographic info, and/or owner suitability info and submitting this information to the custodian.

For example, advisors may enter client information such as name, address, employment information, identification information, affiliations, etc. Advisors may also record financial profile and related client info of each client. Client's picture, contact number, and social links may also be displayed. Both person and entity type of contacts may be supported.

Advisors may enter household information and associate clients with their respective households. Advisors may specify the head of household on each household. Advisors may see all clients and financial accounts associated to the household from the household screen. Activities and opportunities may be captured at the household level.

In a specific example, to open a brokerage account with a particular custodian, the following information may be collected and submitted to the custodian: the primary owner for the account; whether account is a joint account or not; date of birth, tax ID, mailing address, legal address, employment information, and affiliation information for all owners; investment experience and objective as well as risk tolerance for the primary owner (or all owners); whether trading on margin is desired or not; what level of option trading, if any, is desired; whether primary owner is a US citizen, resident, or non-resident alien; whether primary owner is subject to tax withholding; and/or whether cash in account should be swept into a money-market fund.

Advisors may create accounts (e.g., financial accounts) for their clients. Advisors may select product type, product company, and the account type, and/or other attributes for a client product. Financial account information such as account instructions, suitability, investment experience and asset held away may be captured. Advisors may also associate multiple clients to a financial account with different relationship based on the account type. More than one advisor may be associated with a financial account with splits in fee/commission percentage.

Advisors may view positions and transactions for each financial account. The positions and transactions may be automatically gathered and integrated into the account by the system.

Custodians may each have a different format and/or method for accepting account opening data. For example, some custodians may accept the data electronically. Some may accept only paper forms. Different custodians may likely have different forms, and while there may be commonality in the underlying data required by each custodian, there are often enough differences/nuances across custodians to make this process a real challenge.

Custodians may validate the data provided. If any data is missing/inconsistent/incorrect, the custodian may reject the account opening request. This is termed as a not in good order (NIGO) rejection.

Some custodians provide portals/proprietary systems for account opening. These are, however, not standardized. Additionally, without a single system of record, the same information has to be keyed into multiple systems. This may not only require additional time and effort but also may compromise data quality and integrity.

The systems and methods described herein may provide one or more of these features or other features through integration with CRM systems in some embodiments. For example, the described systems and methods may be integrated into a Salesforce™ platform or the like, although any CRM system may be used.

FIG. 1 is a diagram of a system 100 for account automation and integration. The system 100 may comprise a services cloud 110 including a compliance/validation engine 112, a data aggregator 114, a data integrator 116, a web service 118, and/or a database 120. The services cloud 110 may be in communication with custodian platforms 130 including a custodian datafeed service 132 and/or custodian API service 134. The services cloud 110 may also be in communication with a CRM cloud 140 including a CRM API service 142, an app 144, communities 146, and/or a CRM database 148. One or more integration partners 150 may provide data and/or features used by the app 144 such as electronic signature functionality 152, form functionality 154, portfolio management functionality 156, and/or financial planning functionality 158. Each of the illustrated components may be provided by a separate computer or computers (e.g., architecture 600 of FIG. 5), or one or more computers may provide more than one component. For example, each cloud 110, 130, 140 may be a separate system hosted by a separate entity comprising one or more instances of architecture 600. Users (e.g., advisor 102 and/or investor 104) may interact with the app 144 and/or communities 146 using computing devices such as personal computers, smartphones, tablets, laptops, or the like.

The system 100 of FIG. 1 may leverage CRM data to integrate with cloud based partners in order to provide a books and records solution, as well as handle the creation and management (e.g., including asset movement) of financial products. The system 100 may support day-to-day regulatory compliance activities and provide reports, surveillance tests, and regulatory reporting.

The system 100 may aggregate data across multiple platforms and products using intelligent parsing and deciphering techniques to provide normalized information in a single user interface in a way that business, compliance, and technology people can use and understand. The system 100 may solve for one of the largest challenges facing financial service firms today: collecting, understanding, and using data from disparate sources and formats. For example, the system 100 may collect, analyze, and use data from clearing firms, transfer agencies, mutual fund families, insurance carriers, other data aggregators, market data providers, CRM applications, portfolio management systems, and performance management systems, to name a few. The system 100 may process several different types of files, including account information, profile updates, balances, positions, transactions, non-financial activities, market data, etc. The system 100 may support any kind of file transfer mechanisms to receive or fetch data from these sources.

The system 100 may automate processes such as, but not limited to, capturing account information, validations for mandatory information, suitability tests, configurable workflows to support approval cycles, integration with rep licensing systems for license checks, integration with electronic forms products, integration with e-signature products (e.g., Topaz and Ingenico signature pads and DocuSign), integration with document management systems (e.g., Spring CM), integration with service providers that can perform anti-money laundering/OFAC Checks and account creation via straight-through processing (e.g., National Financial Services and Pershing).

The system 100 may provide a unified account opening experience. The system 100 may provide a single system of record for financial account and owner data. Users may load/enter data into the system 100. The system 100 may perform validations and transformations and pass the data to custodians for account opening. The following examples illustrate such transformations further. These examples mention specific CRMs, but the principles illustrated thereby may be applied to system interactions with any CRMs.

a. Individual registration type: A user may want to create an individual account. NFS (a custodian) may require a value of I for individual accounts. Pershing (another custodian) may require a value of INDV. The system 100 may present the registration type as Individual and then map to either I (for NFS) or INDV (for Pershing). This is simple example of a transformation.

b. Joint registration type: Joint accounts may be more complicated in some examples. There may be different types of joint accounts, such as joint—with rights of survivorship, joint—community property, joint—tenants in common, joint—tenants in entirety, and many others. For NFS, the above types may be mapped to values J, COMP, TIC and TIE respectively. Pershing, however, may perform mapping that is split into two separate fields. The system 100 may present the four registration types as four different choices regardless of whether the account is being opened for NFS or Pershing. But if any of these are selected for Pershing, the system 100 may map the value to registration type of JNTN. Additionally, the system 100 may pass an additional field to Pershing to indicate the sub type of the joint account. This sub type (called joint tenancy clause) may be set to JTTN, CMPP, TNCM, and TNET for the four different registration types, respectively.

c. Values may be specific to certain custodians: As an example, Pershing may allow embassy registration type. NFS may not support embassy registration type through the API. In the system 100, the values presented to the user may differ based on the selected custodian.

d. Data elements may be specific to certain custodians: For trust accounts, Pershing may require entry of the type of trust, for example family trust, charitable trust, irrevocable trust, living trust, and other types of trusts. NFS may not require or support a data element for the type of trust. The system 100 data model may capture the type of trust. If opening an account for the trust, the system may send the type of trust to Pershing but not send the same to NFS. If this value were not filled, the system 100 may allow the user to create an account with NFS, but if the user were to try and create an account with Pershing without filling the type of trust, the system 100 may display a message and require the user to fill in the value in order to avoid a NIGO.

In addition to differences in data elements and transformations, the method to transmit the data may also vary by custodian.

a. For custodians that provide an API for opening accounts (straight through processing), the system 100 may send the translated data using proprietary custodian APIs and display the return status to provide users with a seamless experience. Thus, users may input data in the system 100, the data may be validated and transformed in the system 100 and transmitted to the custodians via the appropriate custodian API. The custodian API may also run its own validations and if all validations succeed, may return an account number. This account number may be populated in the system 100 to complete the process.

b. Certain custodians may not provide an API for straight through processing, but instead may provide a portal for users to open accounts. They may also provide an API/mechanism to transmit data elements to this portal such that these data elements may be pre-filled in the portal, and the user may not have to re-enter them. In such cases, the system 100 may capture the account information, validate and transform it, and send it across to the custodian by a pre-fill API/mechanism. The system 100 may launch the custodian portal for the user to complete the account opening process with the appropriate data pre-filled.

The final step in the account opening process may be the paperwork and signature process. For custodians that do not offer an account opening API, this may be the only way to send the data to them. Even custodians that offer an account opening API may require completed forms and signatures.

Each custodian may have their own set of forms to be completed and signed by the appropriate parties. The system 100 may integrate with forms automation vendors. The forms vendors may offer a library of forms published by custodians and other sources. The custodians may publish new forms and updates to their existing forms into this library. System 100 users may also publish their custom forms into this library.

The forms vendors may offer an API for pre-filling forms. In the system 100 account opening process, for the custodian and type of account being opened, the system 100 may display a list of applicable forms to the user. Users may select the forms that they would like to submit for the account. The system 100 may use the APIs provided by the forms vendors to create an envelope/bundle with the selected forms and use the appropriate pre-fill APIs to have the forms pre-filled with the data from the system 100. This may eliminate duplicate data entry and improve data quality and integrity.

For the forms pre-fill, system 100 data may be transformed and formatted as required by the forms vendors. The transformations may be analogous but distinct from the transformations required for the account opening API. The system 100 may retain the unified data model but perform custodian and even form specific transformations as needed.

In addition to forms vendors, the system 100 may integrate with electronic signature vendors to ensure that users can track the status of the forms once submitted and have end-to-end visibility in the entire account opening process.

The system 100 approach to unified account opening may allow running additional validations, compliance, and regulatory tests, collectively called suitability and OFAC checks, prior to and over and above what custodians may require. These tests may allow customers to enforce firm wide policies and requirements and comply with various regulations, including but not limited to suitability standard, fiduciary standard, PATRIOT act, etc.

Figure 2:
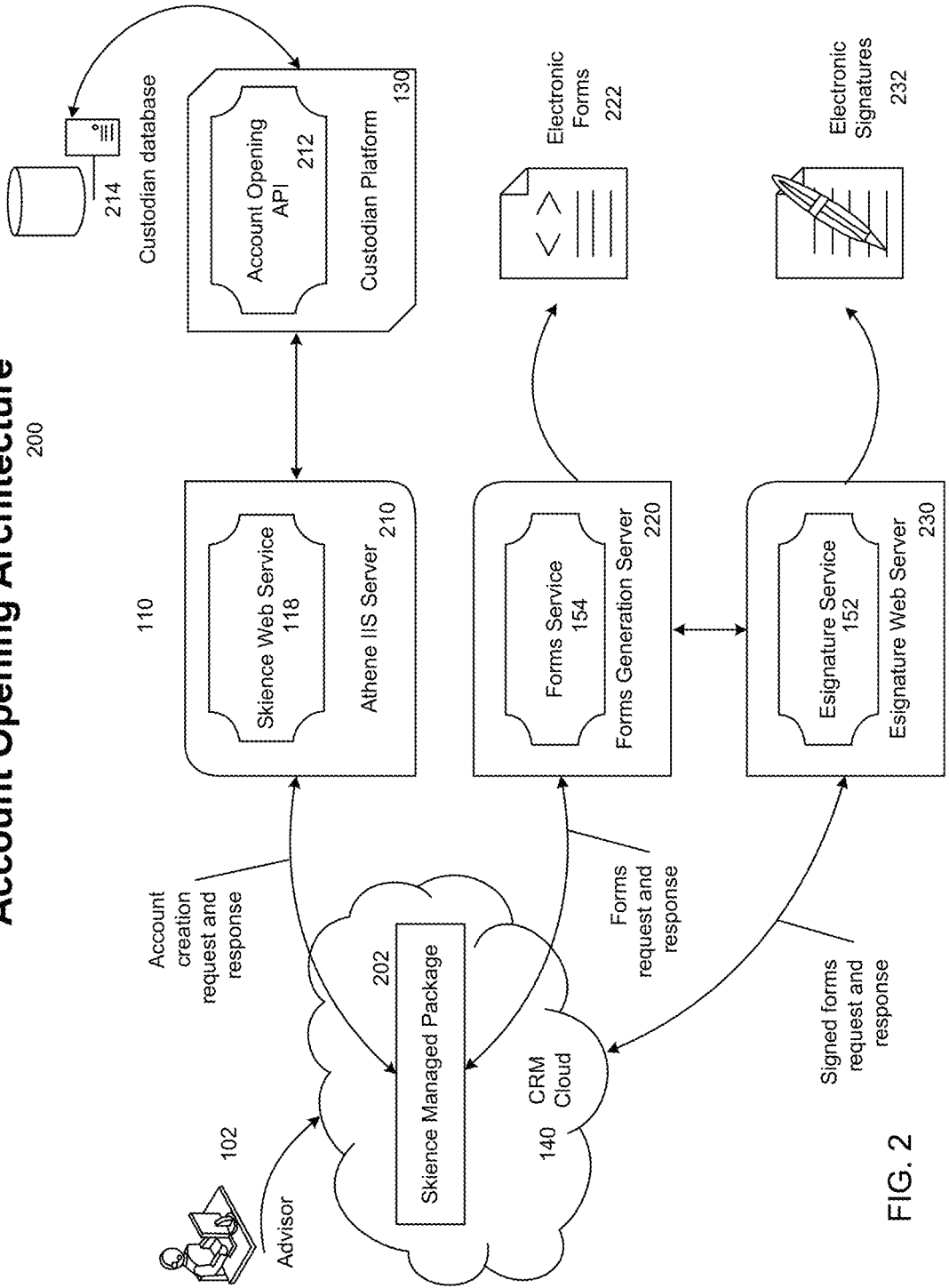
FIG. 2 is an example account opening automation architecture configured to perform processing as described with respect to FIGS. 3A-4D.
Figure 3A:
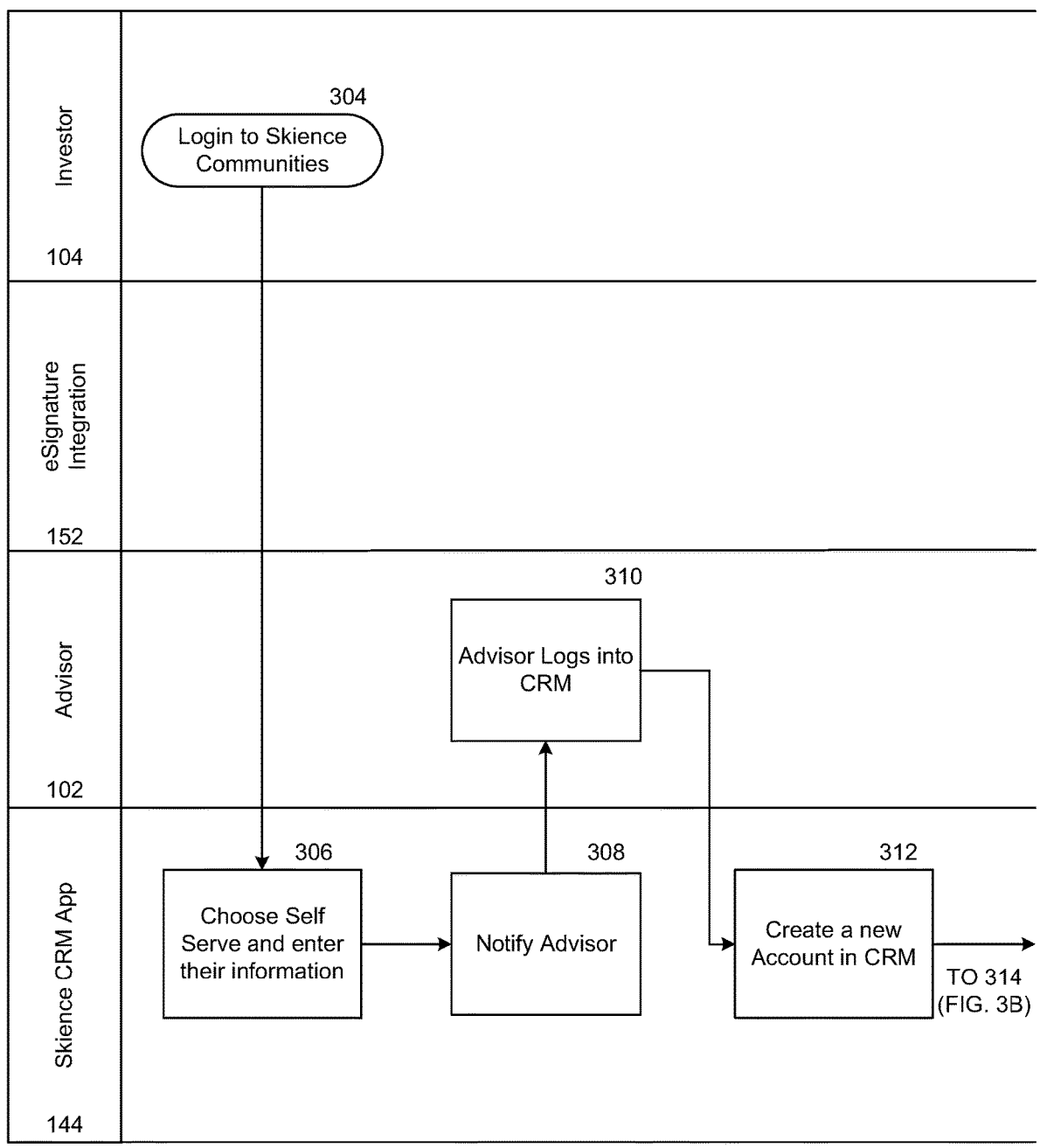
Figure 3C:
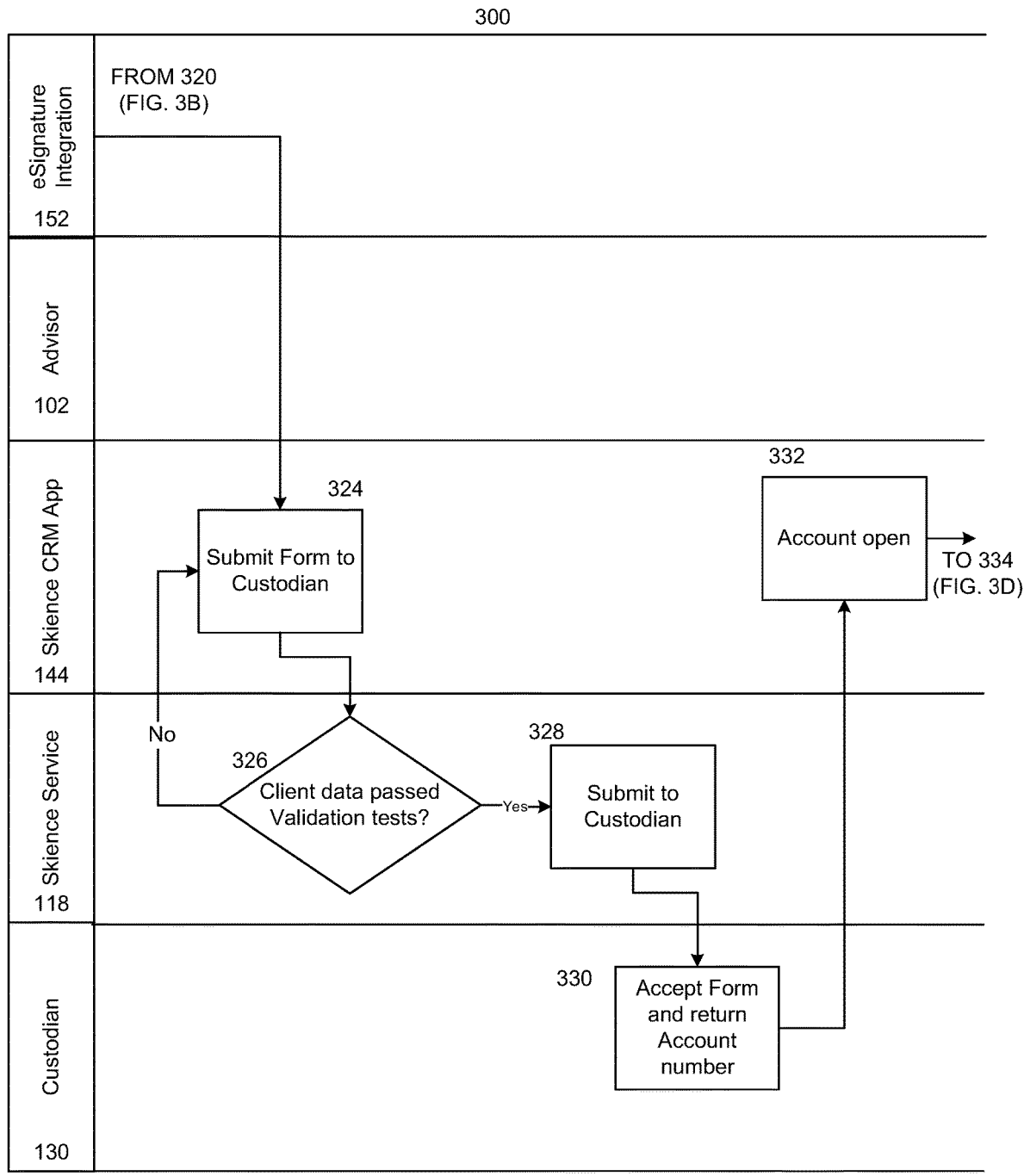
Figure 4A:
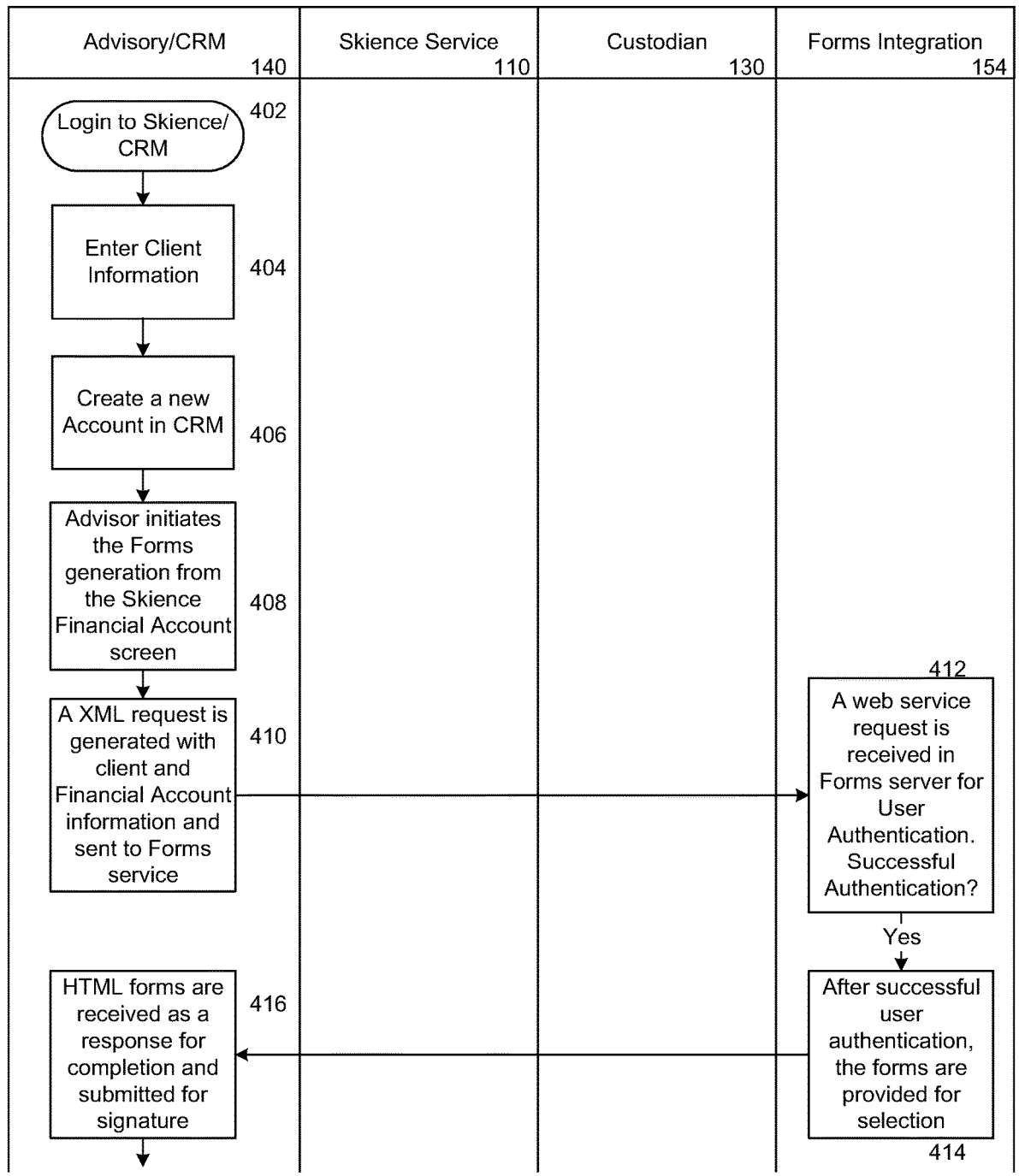
Figure 4C:
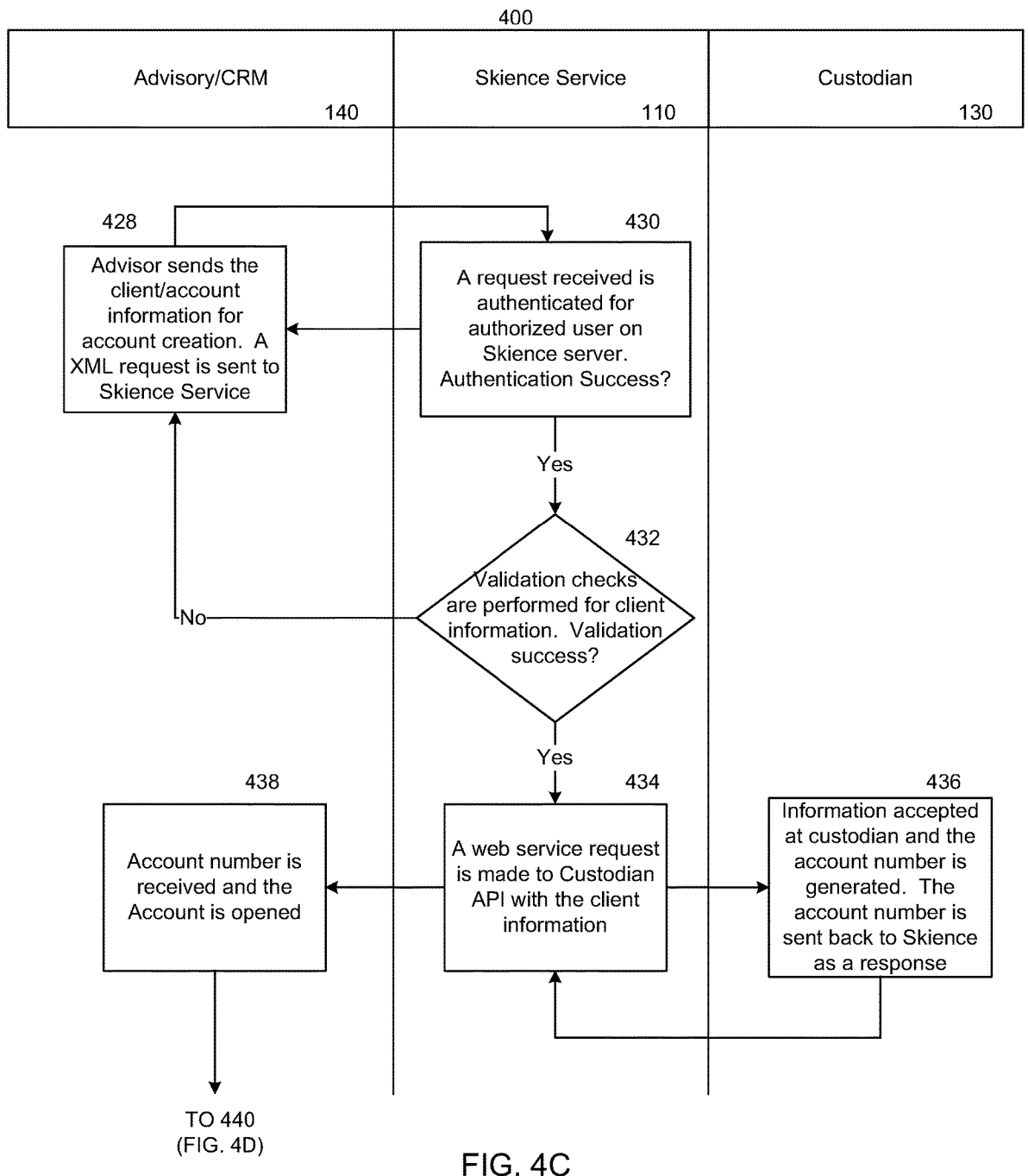

FIG. 2 is an example of how the system 100 may provide architecture 200 for automating account opening processes as described with respect to FIGS. 3A-4D, for example. The architecture 200 of FIG. 2 may involve a managed package 202 (e.g., provided to advisor 102 through the app 144 of FIG. 1) accessible within the CRM cloud 140. As described herein, the advisor 102 may enter information into the managed package 202, and a web service 118 provided by an internet information services (IIS) server 210 may process an account creation, including communicating with an account opening API 212 of a custodian platform 130 to actually open the account within the custodian's database 214. Furthermore, a forms service 154 provided by a forms generation server 220 may automatically generate forms with information captured during user entry to effect the creation of the account. A forms package 222 may be created and sent to the client for review and signature. The status of the forms package 222 may be tracked inside the managed package 202, along with a timestamp, until the completion of signatures on all forms. For example, an eSignature service 152 provided by an eSignature web server 230 may provide form signing functionality. Completed (e.g., signed) forms 232 may be stored in CRM cloud 140 and/or within an integrated document management system. The eSignature service 152 may automatically route the signed forms to the account custodian platform 130, for example for storage in the custodian database 214.

FIGS. 3A-3D illustrate an example of straight through processing 300 including user interactions with the system. FIGS. 4A-4D illustrate processing 400 that may be performed by the system (e.g., using architecture 600 and listed elements of the system 100 of FIG. 1) to accomplish the straight through processing 300. Straight through processing 300 may integrate the system 100 directly with the end custodian and allow a user to create an account with the click of a button.

Turning first to the user-centered straight through processing 300 example, in 304, an investor 104 may login to the app 144 (e.g., using a personal computer, smartphone, tablet, or other device as discussed above). In 306, using the app 144, the user may choose "self-service" or a similar option and enter information as discussed above.

In 308, the app 144 may notify the advisor 102 (e.g., by generating and sending an email, text message, in-app notification, etc.). In 310, the advisor 102 may log into the app 144 (e.g., using a personal computer, smartphone, tablet, or other device as discussed above). In 312, the advisor 102 may create an account for the investor 104 and/or transaction to be processed. In 314, the advisor 102 may select forms for the account using the app 144.

The selected form options may be sent to the forms service 154. In 316, the forms service 154 may provide the selected forms to the app 144. In 318, the advisor 102 may complete the forms in the app 144 and submit them for signatures.

In 320, the eSignature service 152 may receive the submitted forms and present them to the investor 104 for signatures. For example, the eSignature service 152 may generate an email, text message, or other notification, or the investor 104 may log into the app 144 or an eSignature app to sign the forms. In 322, the investor 104 may sign the forms. The eSignature service 152 may send the signed forms to the app 144.

In 324, the advisor 102 may submit the signed forms to the custodian 130 using the app 144. In 326, web service 118 may evaluate the signed forms for errors. If errors are found, the signed forms may be returned to the advisor 102 in the app 144 for correction. The advisor 102 may make corrections and resubmit the forms. If no errors are found or after errors are corrected, in 328, web service 118 may submit the signed forms to the custodian.

In 330, the custodian may accept and process the forms and return an account number for the new account opened by processing of the forms to the app 144. In 332, the app 144 may report account opening to the advisor 102 and/or investor 104.

In 334, the advisor 102 and/or investor 104 may opt to fund the account using the app 144. For example, the user can enter a value to place into the account and a selection of a bank from which to draw the value. In 336, the app 144 may send data describing the request to the bank and/or retrieve information about the bank allowing the funds to be transferred (e.g., routing number and account number). In 338, the bank may transfer the funds, and the app 144 may provide notification that the account has been funded.

Turning to the system processing 400 example, corresponding to the user-centered straight through processing 300, in 402, the CRM cloud 140 may receive user login data from the advisor 102 (e.g., through the app 144) and log the user in. In 404, the CRM cloud 140 may receive client information from the advisor 102 through the app 144. In 406, if the client information relates to a new client, the CRM cloud 140 may create a new account (if not, this step may be skipped).

In 408, the CRM cloud 140 may receive forms data from the advisor 102 through the app 144. In 410, the CRM cloud 140 may generate a request (e.g., an XML request) with client and financial account information received from the advisor 102 (e.g., as part or all of the forms data). The CRM cloud 140 may send the request to the forms service 154.

In 412, the forms service 154 may receive the request and authenticate the request. If authentication is successful, in 414, the forms service 154 may generate and/or provide forms to the CRM cloud 140.

In 416, the CRM cloud 140 may receive the forms from the forms service 154. For example, the forms may be in HTML or another fillable format. In 418, the CRM cloud 140 may receive data from the advisor 102 (e.g., through the app 144) completing the forms. The CRM cloud 140 may generate a request (e.g., an XML request) for eSignature. The request may include the form details. The CRM cloud 140 may send the request to the forms service 154.

In 420, the forms service 154 may receive the request and send it to the eSignature service 152. In 422, the eSignature service 152 may receive the request and send a request (e.g., an email or other notification as described above) for eSignature to the investor 104. For example, the message sent to the investor 104 may include an eSignable form. In 424, the eSignature service 152 may receive the signed form from the investor 104 and send it to the CRM cloud 140 (e.g., as an XML response).

In 426, the CRM cloud 140 may receive the signed forms and present them to the advisor 102. The CRM cloud 140 may receive indication of approval from the advisor 102 through the app 144. The CRM cloud 140 may submit approved forms to the custodian platform 130.

In 428, the CRM cloud 140 may receive client and account information for account creation and/or funding. The CRM cloud 140 may send a request (e.g., an XML request) to the services cloud 110 to create the account.

In 420, the services cloud 110 may receive the account creation request and authenticate. If authentication is unsuccessful, the services cloud 110 may notify the CRM cloud 140, so the CRM cloud 140 can receive corrected data from the advisor 102. If authentication is successful, in 432, the services cloud 110 may validate the client information. If validation is unsuccessful, the services cloud 110 may notify the CRM cloud 140, so the CRM cloud 140 can receive corrected data from the advisor 102. If validation is successful, in 434, the services cloud 110 may send a web services request to the custodian 130 API including the validated information.

In 436, the custodian 130 may accept the information and generate an account number. The custodian 130 may return the account number to the services cloud 110, which may send the account number to the CRM cloud 140.

In 438, the CRM cloud 140 may receive the account number and open the account. In 440, the CRM cloud 140 may fund the account. For example, in 442, the CRM cloud may receive investor asset/bank information from a bank 302. In 444, the CRM cloud 140 may fund the account.

Advisors can create and update the financial accounts at custodian using the straight through processing. For example, financial accounts can be submitted using "Submit to Custodian" and "Update to Custodian" buttons available on financial account screen of a user interface presented by the app. The Update to custodian button may also be available on Client and Household screens to support the update of multiple financial accounts associated with Client and Household. The system may generate account data from the submitted information, and certain validations may be performed for compliance before the information is passed to custodian and an account number gets established at custodian. The established account number may be received by the system and updated on the Financial Account immediately along with the established date and status of the account. The processing details enabling straight through processing are shown in FIGS. 4A-4D.

FIGS. 5A-5F show screenshots for an account opening wizard 500 according to an embodiment of the invention. For example, the app 144 may provide the wizard 500 to facilitate the account opening described above.

The account opening wizard 500 may be launched independently or from the account or client screens. The account opening wizard 500 may collect all information relevant to create a new account with a custodian 130. The account opening wizard 500 screens may perform validation checks as the advisor 102 enters information for their client. The account opening wizard 500 may prevent the user from completing the account creation if all the relevant information is not completely filled including the fields required to prevent a NIGO error from the custodian 130.

Figure 5C:
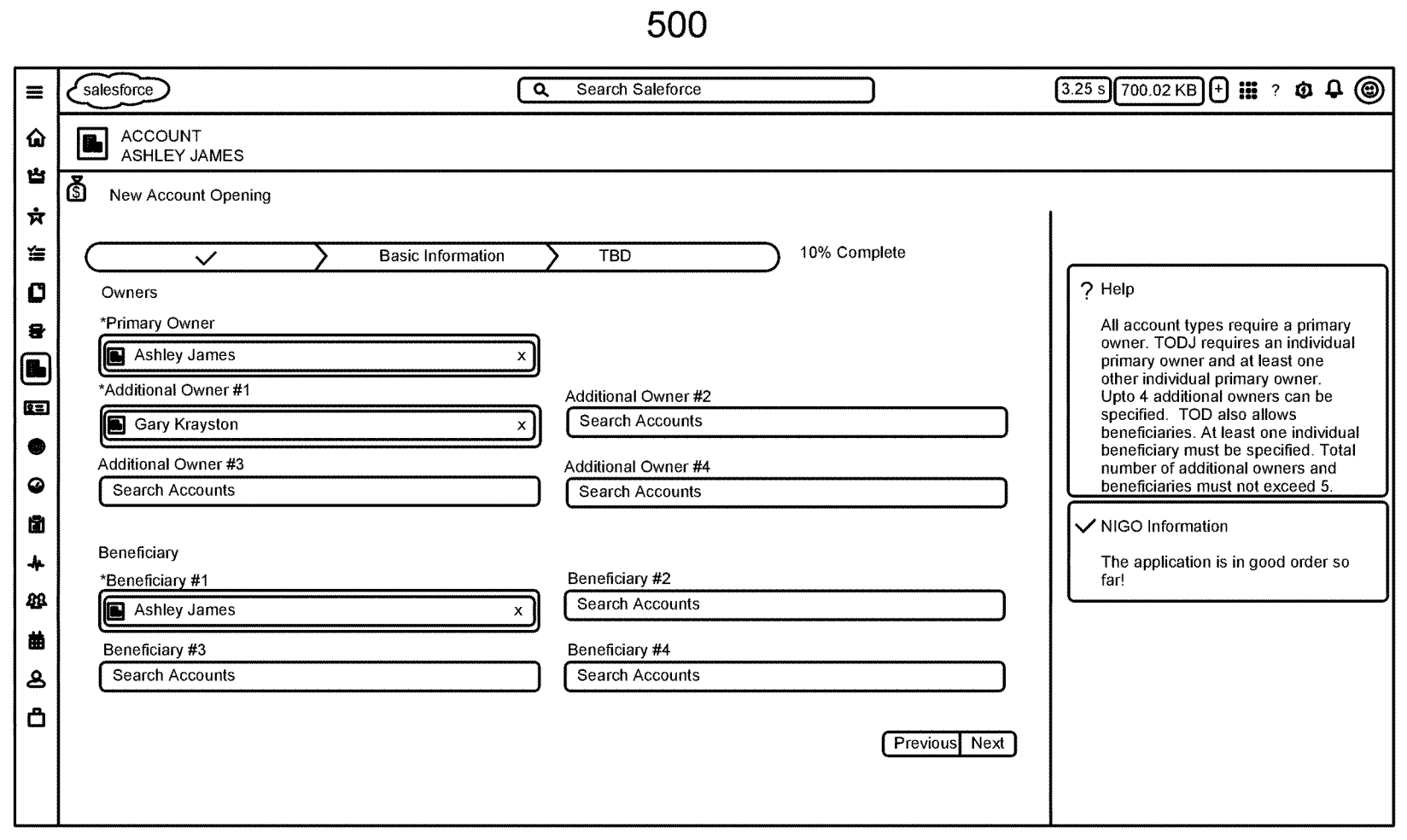
Figure 5D:
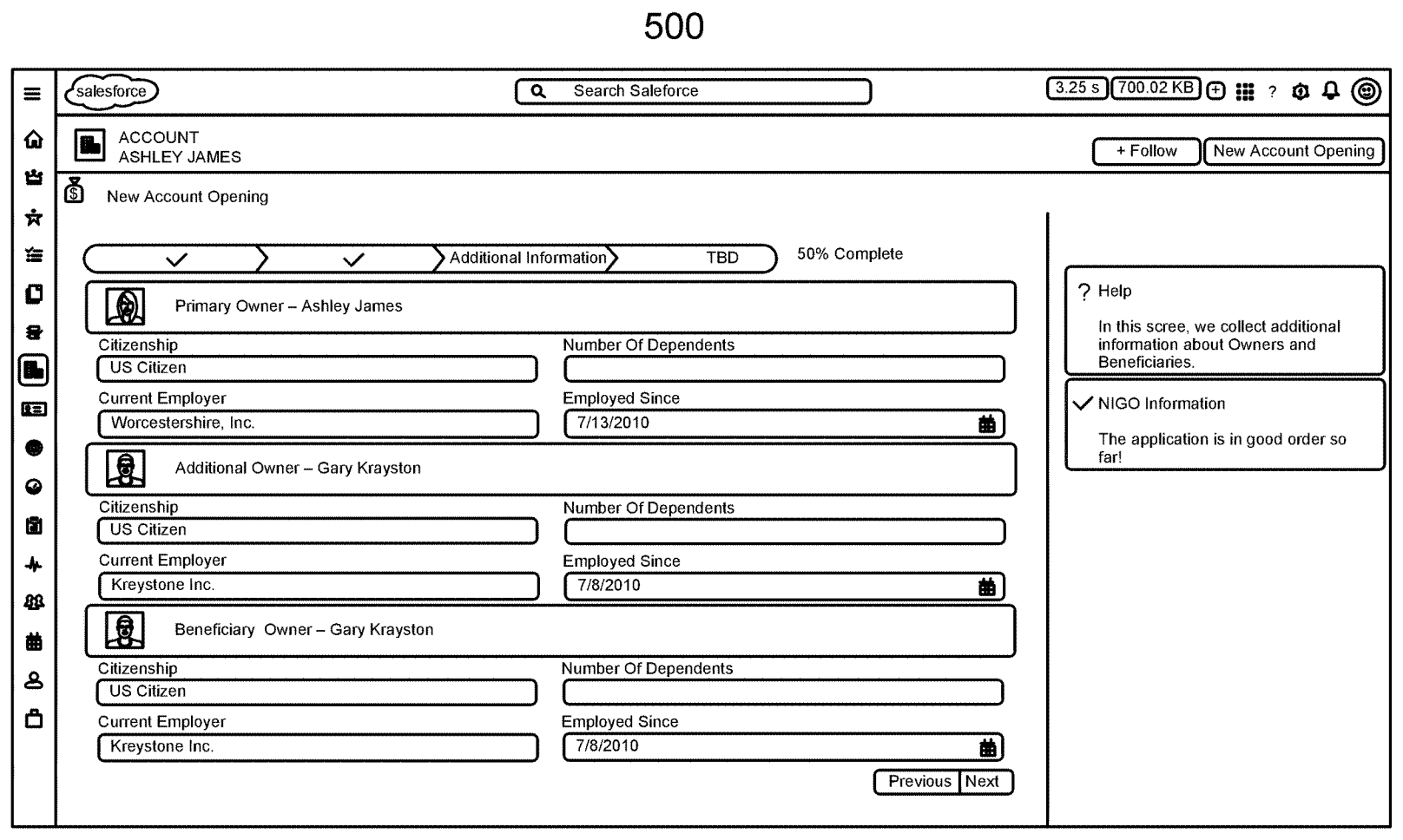
Figure 5E:
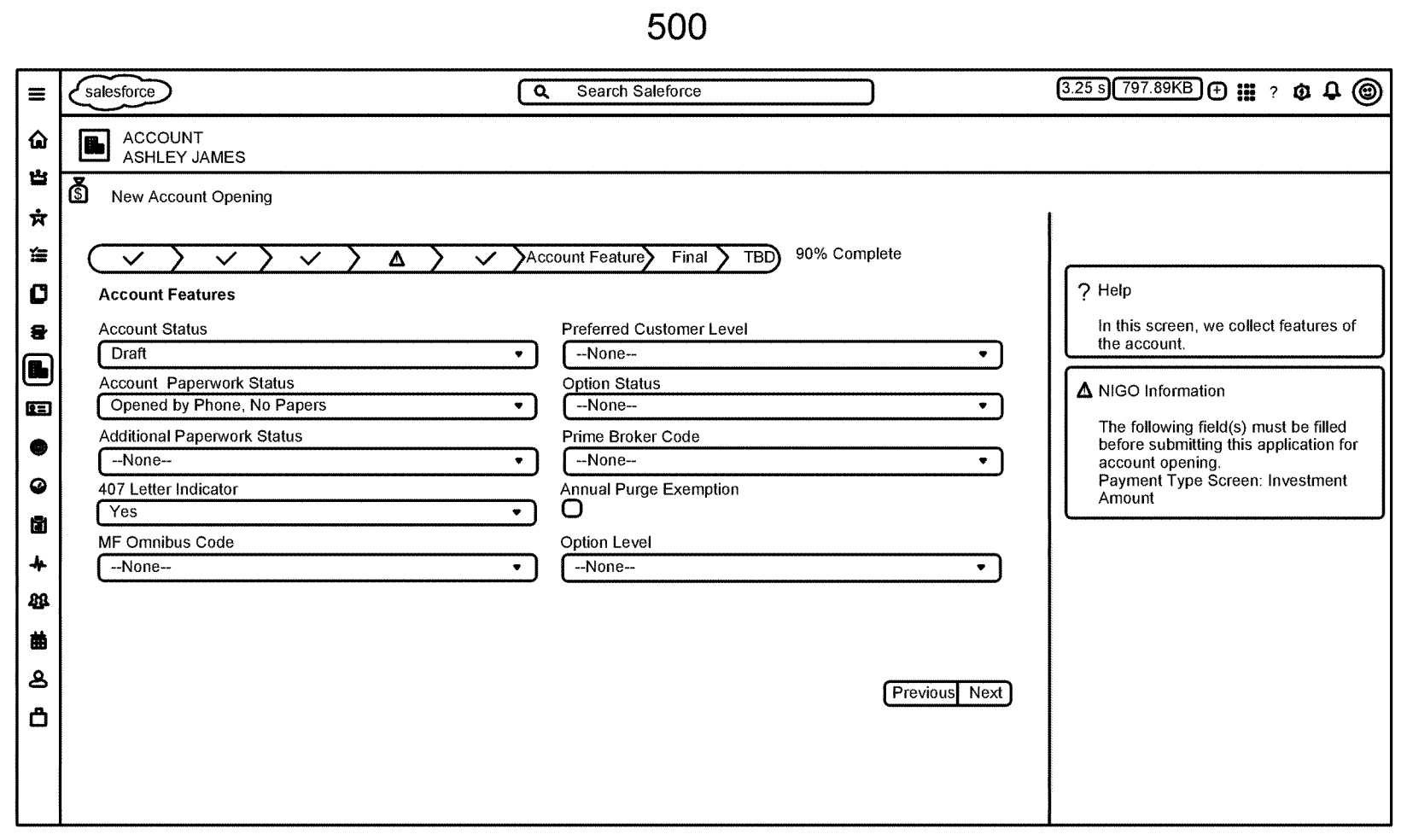

In the illustrated example, the advisor 102 starts from the user's account details page as shown in FIG. 5A. The account opening wizard 500 may be displayed and may guide the advisor 102 through the new account information collection process as shown in FIGS. 5B-5F. At the end of the wizard process, a new account may be created in the CRM system 140 as described above. For straight through processing 300, this account information may be sent to the custodian 130 through the system web service 118, and a new account may be created with the custodian 130. Alternatively, the forms integration 154 may allow the advisor 102 to create account related forms and then manually/electronically submit these forms to the custodian 130.

Straight through processing may provide a number of technical advantages. For example, automating end to end account processing eliminates the need for data entry in multiple systems, reducing errors with each separate system of manual entry and may reduce account creation/update processing down time within the system, allowing more accounts to be created and/or updated by a single system or server, in addition to reducing the time from submission of data to completion of processing.

As shown in the straight through processing examples of FIGS. 3A-4D, the system may integrate with other systems for form generation, for example Quik! Forms Library and DocuSign for forms generation and eSignature functionality, respectively. Advisors may generate the appropriate forms from the financial account in the system app and send them to clients to get a signature digitally.

The system may collect the current context (the financial account selected by the user) and pick up the data values from this financial account object. Advisors may click on the "Generate Forms" button on Financial Account screen, and in response the system may provide the forms that are relevant for the financial account that was selected. Optionally, the advisor can select other relevant forms.

The forms may be generated on the screen and the associated financial account information may automatically get filled into the forms. Advisors can send the forms to the client for eSignature using Sign button on the form. The signed forms may be received in the system and may be made available for printing/saving. Additionally, the system may push these forms to a customer's document storage service.

Advisor can print and send/email the signed form to the custodian or the system may automatically send the form directly to the custodian.

Automatic forms processing may provide a number of technical advantages. For example, automating form generation may reduce account creation/update processing down time within the system, allowing more accounts to be created and/or updated by a single system or server, in addition to reducing the time from submission of data to completion of processing. Should compliance errors be detected, the automated form processing features may correct them automatically and/or highlight information that a user needs to change. This may provide further efficiencies in the overall forms processing.

As shown in the straight through processing examples of FIGS. 3A-4D, the system may provide compliance processing to detect errors and/or violations in the submitted information, thereby ensuring that the generated forms are valid for their intended purpose. In addition to financial account validations (e.g., ensuring that the information complies with the standards for data needed to establish a financial account), the system may also provide suitability and OFAC (Office of Foreign Assets Control) checks. A user selecting a "Run Suitability tests" button on a financial account user interface may prompt the system to execute certain validation rules based on the information provided on financial account and displays the test results. The "OFAC/CIP check" button on financial account may send the contact information to EVS to perform the identity verification. EVS (Electronic Verification System) is a third-party tool that verifies if a person or business in on OFAC watch list and performs the identity verification. In other embodiments, the system may send contact information to other services (e.g., other CRM services) to perform the verification.

Automatic compliance processing may provide a number of technical advantages. For example, automating compliance processing may reduce account creation/update processing down time within the system, allowing more accounts to be created and/or updated by a single system or server, in addition to reducing the time from submission of data to completion of processing. Compliance processing may also be more consistent and reliable than manual user review.

The system may also provide a Financial Planning tool available within the user interface. For example, the system may be integrated with Money Guide Pro (MGP) or a similar service for creating financial plans. Advisors may capture client information, their related contacts, their Financial Profile information such as income, expenses etc. On clicking the "Create Financial Plan" button on Household/Client screen, MGP page may be launched using SSO without having Advisor to login into MGP. The information captured by the system may flow in to MGP using web services, and the Advisor may be able to work on the financial in MGP within the system user interface. Advisor may also track the financial plans over time as new information is entered into the system. The system may update the data in MGP, periodically sending new data as it is entered.

The system may also provide integration with NASU (National Financial's New Account Setup) for opening the new accounts within an NF Streetscape system. Advisors may create Brokerage accounts in the system and click on "Open in NASU" button on Financial Account screen. A Streetscape application may be launched within the system app using Single-Sign-On, and the financial account information may be prefilled in the Streetscape on the appropriate fields. Advisor can verify/add/modify the information in Streetscape and submit it for account creation.

The system may also provide integration with IWS (Fidelity's Institutional Wealth Services) for opening new accounts with financial service providers (e.g., Fidelity's Wealth Central system). Advisors can create non-brokerage accounts in the system and click on "Open in WealthCentral" button on Financial Account screen. The Wealth Central system may be launched within the system app, and the financial account information may be prefilled in the system on the appropriate fields. Advisor can verify/add/modify the information in Wealth Central system and submit it for account creation. No SSO is involved here. Advisor may be required to login into Wealth Central system in some embodiments.

The system may also provide integration with Streetscape A-la-Carte and Feature Direct pages. Advisors may access real-time positions, transactions, and/or account balances for the Financial Account from Streetscape within the system using A-la-Carte and Feature Direct pages. Advisors may also access Cashiering, Service center, Statements, and/or Reports from Streetscape. These ALC and FD pages may be accessed using Single-Sign-On, and Advisors need not require to login to Streetscape.

The system may also provide Data Aggregation by receiving, parsing, and aggregating Clients' Financial Account holdings from multiple sources (e.g., Clearing Firms, Transfer Agencies, Product Manufacturers and Other Related Sources) in order to see all holdings for a Client. Advisors may access this data within their CRM in order to obtain all holdings for a Client in one place, rather than across multiple systems.

The system may leverage web services to transmit aggregated data into the CRM on a nightly basis. For example, the system may regularly update information such as, but not limited to, New Accounts, Account Updates, Updated Balance Information, Updated Positions Information, and/or Transactions Information. Advisors may access latest financial account information from different user interfaces in the system.

The system may perform surveillance tests, for example Configurable Suitability tests during the New Account creation process which may include, but are not limited to, Customer Age, Net Worth, Tax Bracket, Investment Objective, Time Horizon, and Risk Tolerance tests. Configurable tests may be applied to transactions loaded each night from vendor files, for example B share aggregation, C share aggregation, breakpoints, and/or reinstatements for Mutual Funds.

The system may provide reporting such as switching (selling shares in one fund and purchasing in another where client incurs higher sales charges) report capabilities across vendors and products. The system may also provide Regulatory Reports such as Trade Blotter, across products and vendors, with workflow and review capability.

The following is an example account opening process which may be performed by the system. The process may include the following steps:

a. Capture investor and financial account information
b. Perform data validations as the data is being entered
c. For complex tests/transformations, serialize the financial account data and invoke business logic in the system services layer. The system data model may be normalized, and data may be stored in multiple objects to avoid data duplication. The serialization process may query the data in all related objects and, for further processing, convert it to a well-known standard format such as xml/json. Below is sample pseudo-code for the serialization process. Actual implementation may vary based on context:
  i. Start with an initial object, in this case the system financial account object.
  ii. Use metadata about the object to query all the fields in this object and convert to json/xml as appropriate. As a simple example, if financial account object has 3 fields, e.g., product company, account registration type, and product type, all 3 fields may be queried for the financial object to be serialized and will be converted to JSON/XML.

The JSON snippet may look like:

```
{
"skience_product_company": "National Financial",
"skience_account_registration_type": "Joint - With Rights of Survivorship",
"skience_product_type": "Brokerage"
}
```

The XML snippet may look like:

```
<skience_product_company>National Financial</skience_product_company>
<skience_account_registration_type> Joint - With Rights of Survivorship </skience_account_registration_type>
<skience_product_type> Brokerage</skience_product_type >
``` iii. Use metadata on related objects to query and serialize related objects. For example, account relationships may be a related object of financial account that stores all relationships such as primary owner, additional owner, etc. The account relationships may also be related to the contact object in SF. Serializing a financial account with Jane and John Smith as the primary and additional owners may result in JSON/XML snippets as follows:

Json snippet:

```
{
"skience_account_relationships": [
{
  "skience_relationship_type": "Primary Owner",
  "skience_account_contact": {
    "first_name": "Jane",
    "last_name": "Smith"
  }
},
{
  "skience_relationship_type": "Additional Owner",
  "skience_account_contact": {
    "first_name": "John",
    "last_name": "Smith"
  }
}
]
}
```

XML snippet:

```
<skience_account_relationships>
  <skience_account_relationship>
    <skience_relationship_type>Primary Owner</skience_relationship_type>
    <skience_account_contact>
      <first_name>Jane</first_name>
      <last_name>Smith</last_name>
    </skience_account_contact>
  </skience_account_relationship>
  <skience_account_relationship>
    <skience_ relationship_type>Additional Owner</skience_relationship_type>
    <skience_account_contact>
      <first_name>John</first_name>
      <last_name>Smith</last_name>
    </skience_account_contact>
  </skience_account_relationship>
</skience_account_relationships>
``` d. The system services layer may take the serialized data as input and performs the requested business logic and/or transformation. Examples of business logic/transformations may include:
  i. Submit account to custodian (straight through processing)
  ii. Run suitability tests
  iii. Run OFAC checks
  iv. Generate pre-fill request for a forms vendor
e. Each request may have specific code and logic to perform the necessary action. For example, the pseudo-code for straight through processing with a custodian may include:
  i. Map requested custodian to registered straight through processing interface. The interface may be code developed to perform custodian specific transformations and invoke the custodian API for straight through processing.
  ii. If no interface is registered, straight through processing for the custodian may not be supported; return the same as a response to the caller.
  iii. If interface is registered, invoke the entry method to perform the actual logic.
  iv. The interface may perform the processing specific to the custodian.
  v. For example, the straight through processing module for National Financial may perform the following actions:
    1. Uses a mapping xml to map the account xml (XML containing financial account data) to a request XML
    2. During the mapping process, the module checks the account xml for missing or incorrect data
    3. If any missing or incorrect data is encountered, the module returns an error with a configured message
    4. If the mapping process succeeds, it submits the account opening request using the APIs provided by NF
    5. The NF API returns a status back along with account number and other information if the account opening process succeeds 6. The module inspects the response from NF and prepares a response back to be sent back to the invoker vi. The straight through processing module for Pershing may follow a similar approach as the module for NF. However, Pershing may require two API calls for account opening. The first call may generate an account number, and the second call may actually submit the account data along with the account number. Such variances are not uncommon across custodians.

Figure 6:
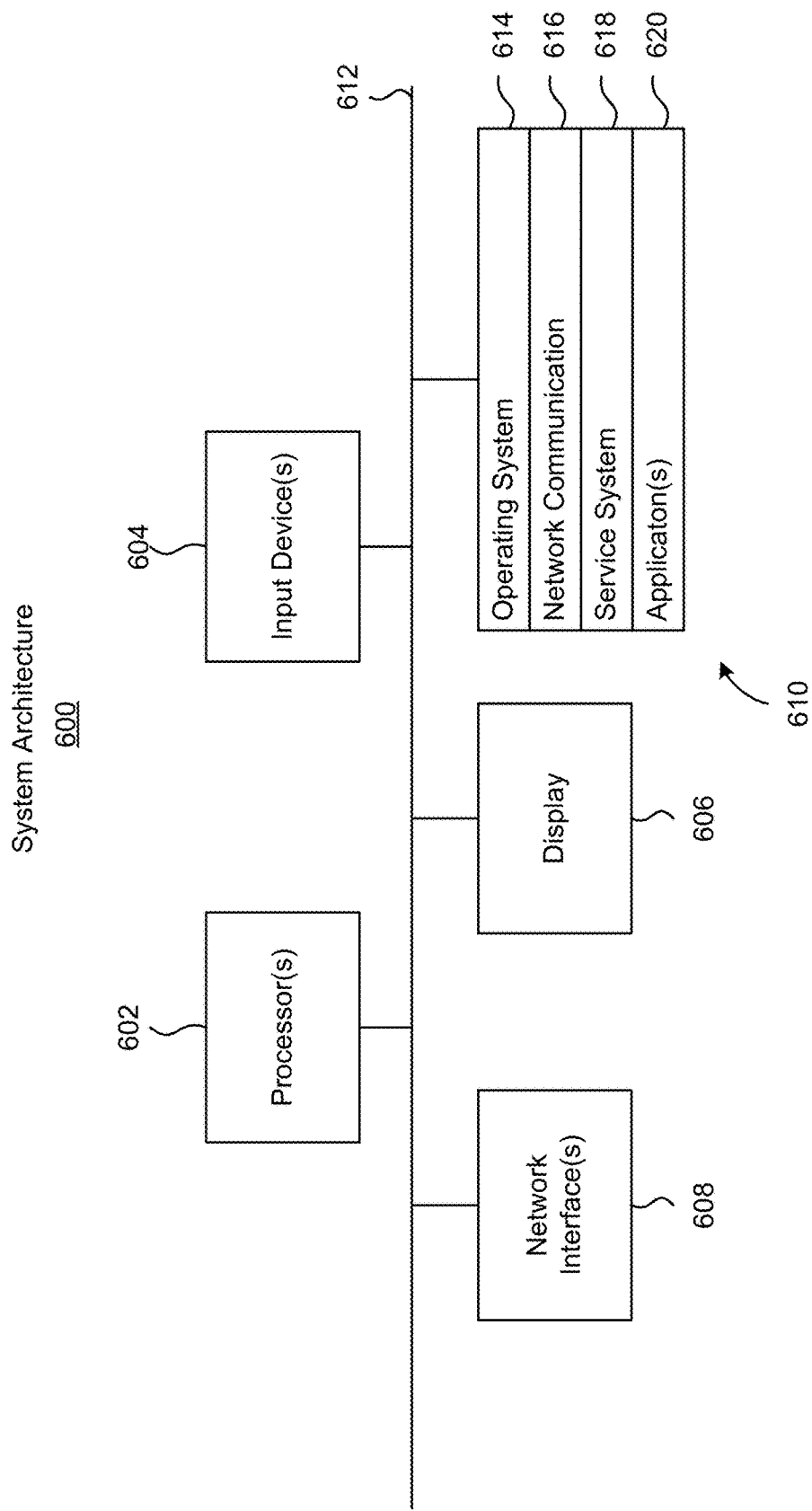
FIG. 6 is a block diagram of an example system architecture implementing the features and processes of FIGS. 1-5F.

FIG. 6 is a block diagram of an example system architecture 600 implementing the features and processes of FIGS. 1-5F. The architecture 600 may be implemented on any electronic device that runs software applications derived from compiled instructions, including without limitation personal computers, servers, smart phones, media players, electronic tablets, game consoles, email devices, etc. In some implementations, the architecture 600 may include one or more processors 602, one or more input devices 604, one or more display devices 606, one or more network interfaces 608, and one or more computer-readable mediums 610. Each of these components may be coupled by bus 612.

Display device 606 may be any known display technology, including but not limited to display devices using Liquid Crystal Display (LCD) or Light Emitting Diode (LED) technology. Processor(s) 602 may use any known processor technology, including but not limited to graphics processors and multi-core processors. Input device 604 may be any known input device technology, including but not limited to a keyboard (including a virtual keyboard), mouse, track ball, and touch-sensitive pad or display. Bus 612 may be any known internal or external bus technology, including but not limited to ISA, EISA, PCI, PCI Express, NuBus, USB, Serial ATA or FireWire. Computer-readable medium 610 may be any medium that participates in providing instructions to processor(s) 602 for execution, including without limitation, non-volatile storage media (e.g., optical disks, magnetic disks, flash drives, etc.), or volatile media (e.g., SDRAM, ROM, etc.).

Computer-readable medium 610 may include various instructions 614 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from input device 604; sending output to display device 606; keeping track of files and directories on computer-readable medium 610; controlling peripheral devices (e.g., disk drives, printers, etc.) which may be controlled directly or through an I/O controller; and managing traffic on bus 612. Network communications instructions 616 may establish and maintain network connections (e.g., software for implementing communication protocols, such as TCP/IP, HTTP, Ethernet, etc.).

A service system 618 may include instructions that perform the account automation and integration features as described above. For example, the service system 618 may implement one or more of the CRM app, eSignature integration, forms integration, system services, custodian, and/or money/asset movement features and processed described in FIGS. 3A-4D.

Application(s) 622 may be an application that uses or implements the processes described in reference to FIGS. 1-5F. The processes may also be implemented in operating system 614.

The described features may be implemented advantageously in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system may be connected by any form or medium of digital data communication such as a communication network. Examples of communication networks include, e.g., a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A method for automating records integration, the method comprising:
   receiving, by a processor, client information;
   identifying, by the processor, a custodian to process the client information from among a plurality of available custodians by analyzing the client information;
   automatically generating, by the processor, at least one form specification based on the analyzing, the automatically generating comprising:
      normalizing and serializing the client information;
      generating a business logic request in a JSON and/or XML request format using the client information,
      determining an application programming interface (API) call format of the custodian
      prior to sending an API call, mapping the business logic request to the API call format through at least one custodian-specific transformation from the JSON and/or XML request format to a request formatted according to the API call format; and
      generating the at least one form specification;
   sending, by the processor, the at least one form specification over a communications network using the API of a form generation service;
   receiving, by the processor, at least one signable form from the form generation service;
   receiving, by the processor, at least one signed copy of each at least one signable form; and
   automatically establishing, by the processor, at least one account with at least one custodian service based on the at least one signable form.

2. The method of claim 1, wherein the external form generation service is one of a plurality of form generation services each having a different API call format for the at least one form specification.

3. The method of claim 1, further comprising providing, by the processor, an app, wherein the receiving of the client information and the receiving of the at least one signed copy of each at least one signable form are received via the app.

4. The method of claim 3, further comprising integrating, by the processor, the app into at least one customer relationship management (CRM) system.

5. The method of claim 1, wherein the automatically establishing the at least one account comprises:
   receiving, by the processor, client account information;
   analyzing, by the processor, the client account information;
   automatically generating, by the processor, at least one account specification based on the analyzing of the client account information;
   sending, by the processor, the at least one account specification over the communications network using the API of the custodian service; and
   receiving, by the processor, at least one account number from the custodian service.

6. The method of claim 5, wherein the automatically establishing the at least one account further comprises funding the at least one account.

7. The method of claim 5, wherein the API of the form generation service and the API of the custodian service are the same.

8. The method of claim 1, wherein the different API call formats include respectively different data elements representing same portions of the business logic request.

9. A system for automating records integration, the system comprising:
   a processor in communication with a form generation service and a custodian service;
   a memory storing computer-executable instructions thereon, that when executed by the processor, cause the processor to perform the operations of:
      receiving client information;
      identifying a custodian to process the client information from among a plurality of available custodians by analyzing the client information;
      automatically generating at least one form specification based on the analyzing, the automatically generating comprising:
         normalizing and serializing the client information;
         generating a business logic request in a JSON and/or XML request format,
         determining an application programming interface (API) call format of the custodian;
         prior to sending an API call, mapping the business logic request to the API call format through at least one custodian-specific transformation from the JSON and/or XML request format to a request formatted according to the API call format; and
         generating the at least one form specification;
      sending the at least one form specification over a communications network using the API of the form generation service;

receiving at least one signable form from the form generation service;

receiving at least one signed copy of each at least one signable form; and automatically establishing at least one account with the at least one custodian service based on the at least one signable form.

10. The system of claim 9, wherein the form generation service is one of a plurality of form generation services each having a different API call format for the at least one form specification.

11. The system of claim 9, wherein the operations further comprise: providing an app, wherein the receiving of the client information and the receiving of the at least one signed copy of each at least one signable form are received via the app.

12. The system of claim 11, wherein the operations further comprise: integrating the app into at least one customer relationship management (CRM) system.

13. The system of claim 9, wherein the automatically establishing the at least one account comprises:

receiving client account information;

analyzing the client account information;

automatically generating at least one account specification based on the analyzing of the client account information;

sending the at least one account specification over the communications network using the API of the custodian service; and receiving at least one account number from the custodian service.

14. The system of claim 13, wherein the automatically establishing the at least one account further comprises funding the at least one account.

15. The system of claim 13, wherein the API of the form generation service and the API of the custodian service are the same.

16. The system of claim 13, wherein the different API call formats include respectively different data elements representing same portions of the business logic request.

* * * * *